April 21, 1959     H. K. GLEASMAN     2,882,755

TWO-SPEED GEAR AND HUB BRAKE FOR VELOCIPEDES OR THE LIKE

Filed Oct. 16, 1957

WITNESS:
Esther M. Stockton

INVENTOR.
Hollis K. Gleasman
BY
Clinton L. Janes
ATTORNEY

United States Patent Office 2,882,755
Patented Apr. 21, 1959

2,882,755

TWO-SPEED GEAR AND HUB BRAKE FOR VELOCIPEDES OR THE LIKE

Hollis K. Gleasman, Elmira, N.Y., assignor to Bendix Aviation Corporation, Elmira Heights, N.Y., a corporation of Delaware Application October 16, 1957, Serial No. 690,463

4 Claims. (Cl. 74—750)

The present invention relates to a two-speed gear and hub brake for velocipedes or the like and more particularly to a semi-automatic direct and overdrive hub.

It is an object of the present invention to provide a novel variable speed drive of the above type which is efficient and reliable in operation while being simple and economical in construction.

It is another object to provide such a device which shifts from direct to overdrive and vice versa responsive to a slight reverse movement of the propelling mechanism.

It is another object to provide such a device in which a self-engaging clutch is incorporated in the direct drive and in the overdrive connection, in such manner that the overdrive clutch tends to engage prior to the direct drive clutch, with novel means under the control of the operator for preventing engagement of the overdrive clutch, thereby permitting engagement of the direct drive clutch.

It is another object to provide such a device in which the controlling means and the gear selecting mechanism operate independently of each other without requiring any particular relationship of torque capacity.

Further objects and advantages will be apparent from the following description taken in connection with the accompanying drawing in which.

Figure 1:
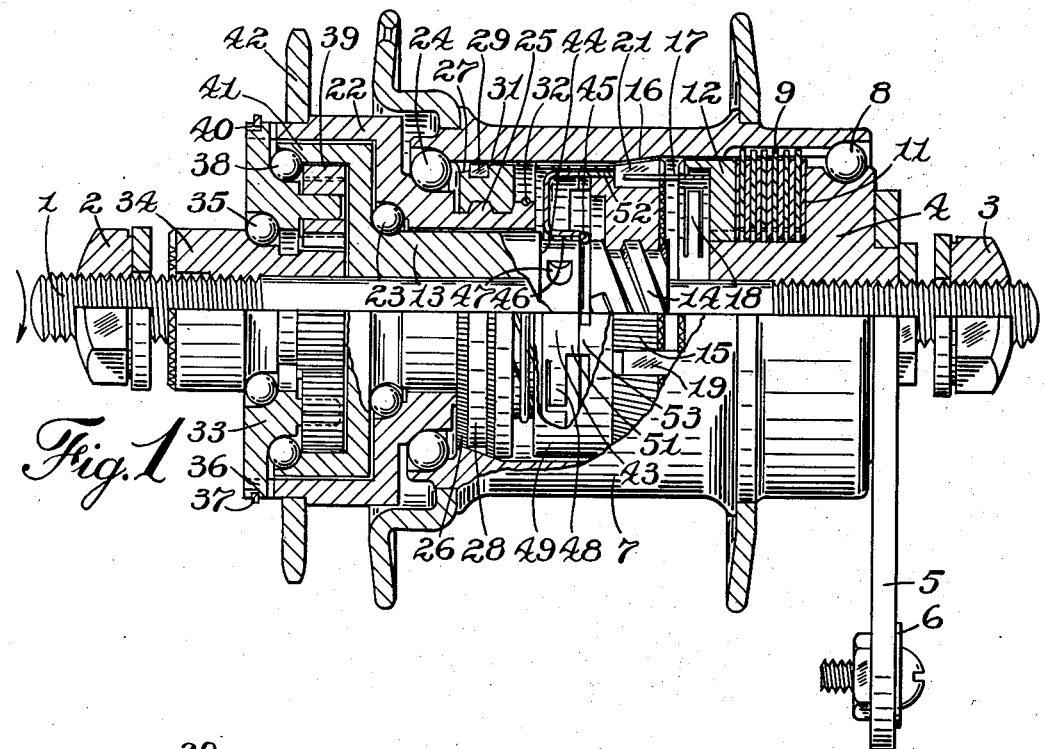
Fig. 1 is a side elevation of a preferred embodiment of the invention partly broken away and in section, showing the parts in the positions assumed while driving in direct or low gear.

In Fig. 1 of the drawing there is illustrated a fixed axle 1 adapted to be clamped in the rear fork of a bicycle or the like by means of clamp nuts 2 and 3. A brake anchor member 4 is adjustably mounted on the axle 1 and prevented from rotation by a torque arm 5 arranged to be attached to a member of the vehicle frame by a clip 6 in the usual manner.

A hub 7 is mounted at one end on the anchor member 4 by means of bearings 8, and a series of discs 9 and 11 are splined alternately to the hub and anchor member and adapted to be compressed by a brake actuating member 12, splined on the anchor member, in order to apply the brake.

A high speed screw shaft and orbit gear member 13 is rotatably mounted on the axle 1 and has a threaded portion 14 on which a high speed clutch nut 15 is threaded for movement into and out of engagement with a high speed clutch surface 16 in the hub. The clutch nut 15 also serves to cause application of the brake on backward rotation of the screw shaft 13, by engagement with the brake actuating member 12. A retarding member 17 has a spring arm 18 bearing frictionally in a counterbore in the interior of the brake actuating member 12 and also has an arm 19 traversing an axial slot 21 in the clutch nut 15 in order to insure traversal of the clutch nut upon rotation of the screw shaft.

Figure 2:
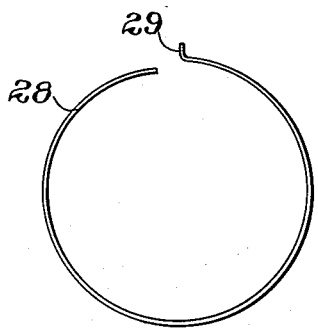
Fig. 2 is a detail of the retarder spring device connecting the low speed clutch nut to the vehicle hub.

A low speed driving and screw shaft member 22 is rotatably mounted on the high speed screw shaft member 13 by means of bearings 23, and supports the opposite end of the hub 7 by means of bearings 24. The low speed driving member 22 has a threaded portion 25 on which a low speed clutch nut 26 is threaded for movement into and out of engagement with a clutch surface 27 in the interior of the hub 7. A spring retarder ring 28 (Fig. 2) bears frictionally in a peripheral groove in the clutch nut 26 and has an outwardly directed tab 29 at one end engaging in an axial slot 31 in the hub whereby the clutch nut 26 is frictionally connected for rotation with said hub. Lock ring 32 is provided on the end of the driving member 22 to retain the clutch nut 26 on the threaded portion 25 thereof.

A planet carrier 33, rotatably mounted on a fixed sun gear and anchor member 34 by means of bearings 35, is connected to rotate with the driving member 22 by means of radial lugs 36 engaging in slots in the driving member and retained by a lock ring 37 seated in a groove 40 in the rim of the driving member.

Preferably the lugs 36 are formed as shown to permit inward axial movement of the planet carrier with respect to the driving member 22, thus providing freedom for adjustment of the bearings 23, 24, 35 and 38. The planet carrier 33 supports the outer end of the high speed driving member 13 by means of bearings 38, and carries a plurality of planetary gears 39 meshing with the sun gear 34 and with an orbit gear 41 formed in the outer end of the member 13 whereby rotation of the driving member 22 as by means of a sprocket 42 fixedly mounted thereon causes the orbit gear and screw shaft 13 to be rotated at a higher speed.

Figure 3:
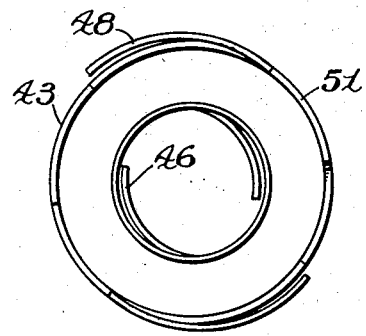
Fig. 3 is a detail of the annular member for controlling the high speed overdrive connection.

Means under the control of the operator are provided for optionally preventing engagement of the high speed clutch nut 15 with the hub in order to drive the hub directly from the member 22 by means of the low speed clutch nut 26. As best shown in Fig. 3, this means is in the form of an annular control member 43 rotatably mounted on the screw shaft member 13 between a shoulder 44 thereon and a lock ring 45, and provided with spring pawls 46 bearing on the surface of the member 13 and arranged to engage in ratchet notches 47 formed in such surface. The control member 43 is frictionally connected to the high speed clutch nut 15 by means of spring arms 48 bearing frictionally in a sleeve 49 fixed in any suitable manner on said clutch nut. This frictional connection is preferably of substantially less torque capacity than that provided by the retarding member 17 to the clutch nut 15. The control member 43 is formed with laterally extending arcuate abutments 51, and the clutch nut 15 has fixed thereon a ring 52 having arcuate abutments 53 extending toward the control member. When the control member is rotated to a position where its abutments 51 are in registry with the abutments 53 of the clutch nut, they are effective to block the traversal of the clutch nut and prevent its engaging the clutch surface 16 in the hub. The pawls 46 of the control member and the ratchet notches 47 in the screw shaft 13 are so coordinated with the arcuate projections 51, 53 of the control member and clutch nut that step by step progress of the control member around the screw shaft 13 brings the arcuate projections alternately into and out of registry with each other and thereby controls the engagement of the high speed clutch.

In operation, starting with the parts in the positions illustrated, forward rotation of the sprocket 42 in the direction of the arrow causes the low speed or direct drive clutch nut 26 to engage the hub and rotate it at the same speed as the sprocket 1, such engagement being ensured by the spring retarder ring 28. This is permitted since, as shown, the projections 51, 53 of the control member 43 and high speed clutch nut 15 are in registry and consequently the high speed clutch nut is held out of engagement with the hub.

If the operator desires to shift to high gear, it is merely necessary for him to rotate the sprocket 42 backward slightly. This rotation is transmitted through the gearing 34, 39, 41 to the high speed screw shaft 13, and since at this time the control member 43 is prevented from backward rotation by its frictional connection 48, 49 to the high speed clutch nut 15, which in return is prevented from rotation by the retarder 17, the ratchet notches 47 in the screw shaft 13 will move one step backward with respect to the control member 14, causing the pawls 46 to engage the next ratchet notch. Upon subsequent forward rotation of the sprocket 42, the control member 43 will be indexed to place its projections 51 out of registry with the projections 53 of the high speed control nut 15, thereby permitting said control nut to engage the clutch surface 16 of the hub and rotate it at high speed.

Shifting back into low gear is accomplished in the same manner, by bringing the projections 51, 53 again into registry to thereby prevent engagement of the high speed clutch.

It will be appreciated that the operator may stop the rotation of the sprocket 42 at any time and allow the vehicle to coast without causing the gear change to take place.

Although but one form of the invention has been shown and described in detail it will be understood that changes may be made in the form and arrangement of the parts without departing from the spirit of the invention.

I claim:

1. In a two-speed hub gear transmission for velocipedes or the like, a fixed axle, a high-speed screw shaft journalled thereon, a low-speed screw shaft rotatably mounted on the highspeed shaft, means for rotating the low-speed screw shaft, overdrive gearing connecting the low-speed screw shaft to the high speed screw shaft, a wheel hub rotatably mounted on the low-speed screw shaft having interior low-speed and high-speed clutch surfaces, a low-speed clutch not threaded on the low-speed screw shaft, a drag member frictionally connecting said clutch nut for rotation with the hub, a high speed clutch nut threaded on the high speed screw shaft, a retarder frictionally resisting rotation of the high-speed clutch nut, an annular control member rotatably mounted on the high speed screw shaft having a ratchet connection therewith, means frictionally connecting the control member to the high speed clutch nut, said control member and high speed clutch nut having arcuate lateral projections which, when in registry with each other, abut and prevent the high speed clutch nut from moving into engagement with the hub, said ratchet connection between the control member and the high speed screw shaft being so arranged that step by step progression thereof brings said arcuate projections alternately into and out of registry.

2. A two-speed transmission as set forth in claim 1 in which the high-speed screw shaft has a series of equally spaced circumferentially arranged notches, and said ratchet connection between the control member and the high-speed screw shaft comprises a ratchet arm on the control member adapted to engage said notches, the notches being so positioned and spaced that engagement of the ratchet arm with the notches in sequence indexes the control member into and out of blocking relation to the high-speed control nut.

3. A two-speed transmission as set forth in claim 1 in which the frictional connection between the control member and the high-speed screw shaft transmits sufficient torque to prevent backward rotation of the control member with the high-speed screw shaft, but is of substantially less torque capacity than the retarder for the high-speed clutch nut.

4. A two-speed transmission as set forth in claim 1 in which the high-speed clutch nut has a sleeve rigid therewith surrounding the control member, and the control member has a spring arm bearing on the interior of said sleeve and forming a frictional connection therewith.

No references cited.